United States Patent
Katayama et al.

[11] Patent Number: 5,880,429
[45] Date of Patent: Mar. 9, 1999

[54] COMPOSITE LASER AND PUNCH PROCESSING DEVICE

[75] Inventors: Isao Katayama, Kagamigahara; Hiroshi Kawai, Kani, both of Japan

[73] Assignee: Murata Kikai Kabushiki Kaisha, Kyoto, Japan

[21] Appl. No.: 940,973

[22] Filed: Sep. 30, 1997

[30] Foreign Application Priority Data

Oct. 3, 1997 [JP] Japan .................................. 8-283206

[51] Int. Cl.$^6$ .................................................. B23K 26/00
[52] U.S. Cl. .............................. 219/121.67; 364/474.08
[58] Field of Search ........................... 219/121.67, 121.7, 219/121.71, 121.72; 83/55, 76.8, 552, 628, 629, 630, 631; 364/474.08, 474.02, 474.21

[56] References Cited

U.S. PATENT DOCUMENTS

| | | | |
|---|---|---|---|
| 4,201,905 | 5/1980 | Clark et al. | 219/121.67 |
| 4,335,296 | 6/1982 | Bredow | 219/121.67 |
| 4,698,480 | 10/1987 | Klingel | 364/474.08 |
| 4,940,880 | 7/1990 | Klingel et al. | 219/121.67 |
| 5,136,521 | 8/1992 | Van Daalen et al. | 364/474.02 |
| 5,279,197 | 1/1994 | Takeda et al. | 83/631 |
| 5,588,344 | 12/1996 | Chun | 83/628 |
| 5,706,711 | 1/1998 | Ito | 83/630 |

FOREIGN PATENT DOCUMENTS

| | | | |
|---|---|---|---|
| 63-104792 | 5/1988 | Japan . | |
| 2-224828 | 9/1990 | Japan | 83/552 |
| HEI 4-78366 | 12/1992 | Japan . | |

*Primary Examiner*—Geoffrey S. Evans
*Attorney, Agent, or Firm*—Armstrong, Westerman, Hattori, McLeland & Naughton

[57] ABSTRACT

The processing device is capable of high efficiency processing with a laser and a punch press while neutralizing the effects on the laser by vibrations caused by punch processing. The punch press device has a servo-motor and a crank system that converts the rotation of the servo-motor to a reciprocal movement of the ram. A NC device controls the processing device. The NC device has determination standards which assign either the punch press part or the laser processing part by predetermined values obtained by the mutual relationship of the work thickness, material and circumferential length with respect to hole processing.

4 Claims, 4 Drawing Sheets

COMPOSITE LASER AND PUNCH PROCESSING DEVICE

FIELD OF THE INVENTION

The present invention relates to a composite processing device provided with a punch press part and a laser processing part.

BACKGROUND OF THE INVENTION

Conventionally, a composite processing device provided with a punch press part and laser processing part has been used. On this type of composite processing device, the laser processing part is arranged in order to perform detailed processing and the processing of complicated shapes such as those which can not be performed by punch processing but for reasons of operating costs and processing efficiency, punch pressing is mainly used. Thus due to these factors, press ability (punch ton amount) is an important specification of the punch press part.

However, when a large press ability is required of the punch processing, this is rarely used and as a punch press part having a large press ability is provided for this seldom used processing, the wasteful use of the equipment is great.

Furthermore, on this kind of composite processing device provided with a punch press part and laser processing part, the large vibrations of during punch processing influence the optical devices of the laser processing part thus maintenance of the high accuracy in the laser processing is difficult.

Conversely, in order to reduce the noise and vibration of the punch press device, it is preferable to reduce the speed at the instant when the punch tool contacts the work surface by changing the punch speed mid-stroke. This kind of speed change mid-stroke is normally impossible for mechanical press devices and requires a hydraulic press.

However, the equipment cost of hydraulic presses increases as a hydraulic unit is necessary. In order to solve this problem, the present applicant tested a device where punch driving was performed directly by a servo-motor. However, with direct driving by a servo-motor, obtaining enough press ability for punch processing when the work is thick or when the hole to be punched has a large diameter is difficult due to the limits of the motor output generally produced.

SUMMARY OF THE INVENTION

In order to solve these problems, it is an object of the present invention to propose a composite processing device used for both punch processing and laser processing, having a low cost, where high efficiency, low production costs and precision processing are possible with the joint use of punch processing and laser processing, and which is capable of neutralizing the effect on the laser processing part of the vibrations from during punch processing.

In order to solve the aforementioned problems, the composite processing device of the present invention is provided with a punch press part driven by a servo-motor and a laser processing part having a higher maximum processing output than the punch press part.

Due to this composite processing device, the hole processing of holes and normal work is achieved with high processing efficiency and low operating costs by the punch press part and the processing of work or holes which can not be processed by the punch press part is performed by the laser processing part. As there is a laser processing part, the work processing may be performed problem free even if the maximum processing output of the punch press part is kept low. As the punch drive system is one driven by a servo-motor, the punch speed may be changed mid-stroke by a simple arrangement and with good controlability thus achieving noise reduction while maintaining a high hit rate. Thus the press processing performs speed control by a servo-motor and as low noise and low vibration is possible, the laser processing may be maintained at high accuracy without effecting the optical devices or the like of the laser processing part for which vibration is detrimental.

On the aforementioned arrangement, the punch drive system of the punch press part may comprise a servo-motor and a crank system that converts the rotation of the servo-motor to a reciprocal movement of the ram.

In this case, the punch drive system may comprise a simple structure without using a special system such as a power increase system or the like, the number of parts may be reduced, the entire device reduced in size and simplified.

On each arrangement of the aforementioned composite processing device, the output required during work processing does not exceed the maximim processing output of the punch press device and moreover, when processing is possible by a tool provided on the punch press part, processing is performed by the punch press part but in all other cases, work processing is performed by the laser processing part.

Due to this arrangement, work which may be processed by either the laser processing part or punch press part is without fail performed by the punch press part thus enabling work processing with reduced energy costs. Furthermore, the processing time may be restricted to the minimum time necessary.

BRIEF DESCRIPTION OF THE DRAWING

FIG. 2A is a sectional side view of the press drive part on the punch press part and FIG. 2B is partially enlarged front view of that.

DETAILED DESCRIPTION OF THE PREFERRED EMBODIMENTS

Figure 1A:
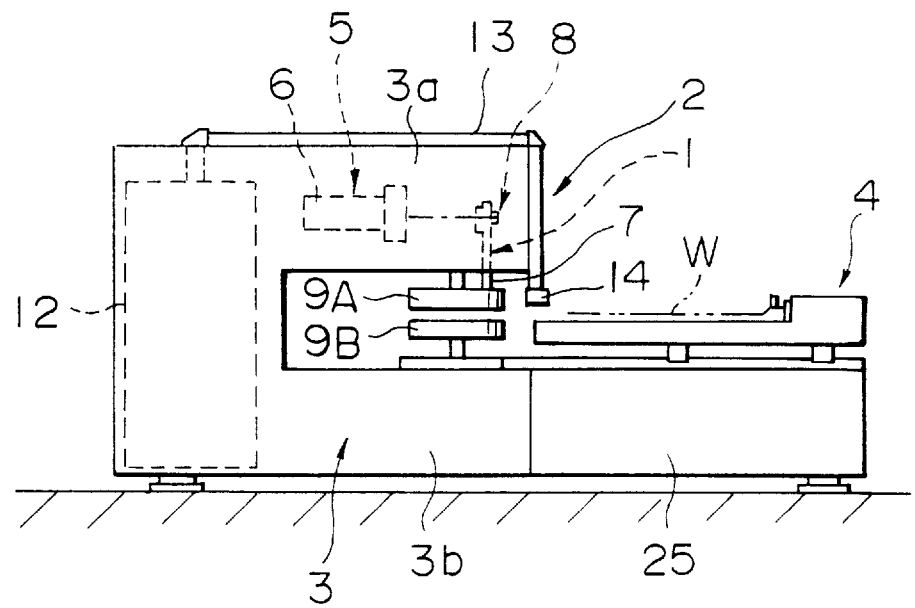
FIG. 1A is a side view of the composite processing device being a first embodiment of the present invention.

A first embodiment of the present invention will be described using FIGS. 1 through 4.

This composite processing device is provided with a punch press part 1 and a laser processing part 2. On an arrangement whereby a frame 3 and table device 4 is common to both of these 1, 2, a punch drive system 5 of the punch press part 1 is driven by a servo-motor 6 and the laser processing part 2 has a maximum processing output higher than the punch press part 1. Due to this, the laser processing part 2 has an output more capable of cut processing a thick work of thickness t than the punch press part 1. In this embodiment, the maximum processing output of the punch press part 1 is taken to be 10 tons. The frame 3 has a C-shape when viewed from the side and the table device 4 is arranged on a bed 25 which is continuous with the front.

The punch press part 1 comprises a turret punch press provided with the punch drive system 5 and turrets 9A, 9B.

The punch drive system 5 drives a ram 7 arranged at the end of an upper frame 3a of the frame 3 such that the speed may be controlled via a crank system 8 by the servo-motor 6. The turrets 9A, 9B are arranged with tools 23A, 23B being punch tools and die tools around the circumference and are arranged in the space between the upper and lower frames 3a, 3b of the frame 3.

The laser processing part 2 is provided with a laser head 14 arranged in the vicinity of the ram 7 on the tip of the upper frame 3a, a laser generator 12 arranged on the floor to the side of the frame 3 and a duct 13 arranged above the upper frame 3a and which guides the laser light between the laser generator 12 and the laser head 14.

Figure 2A:
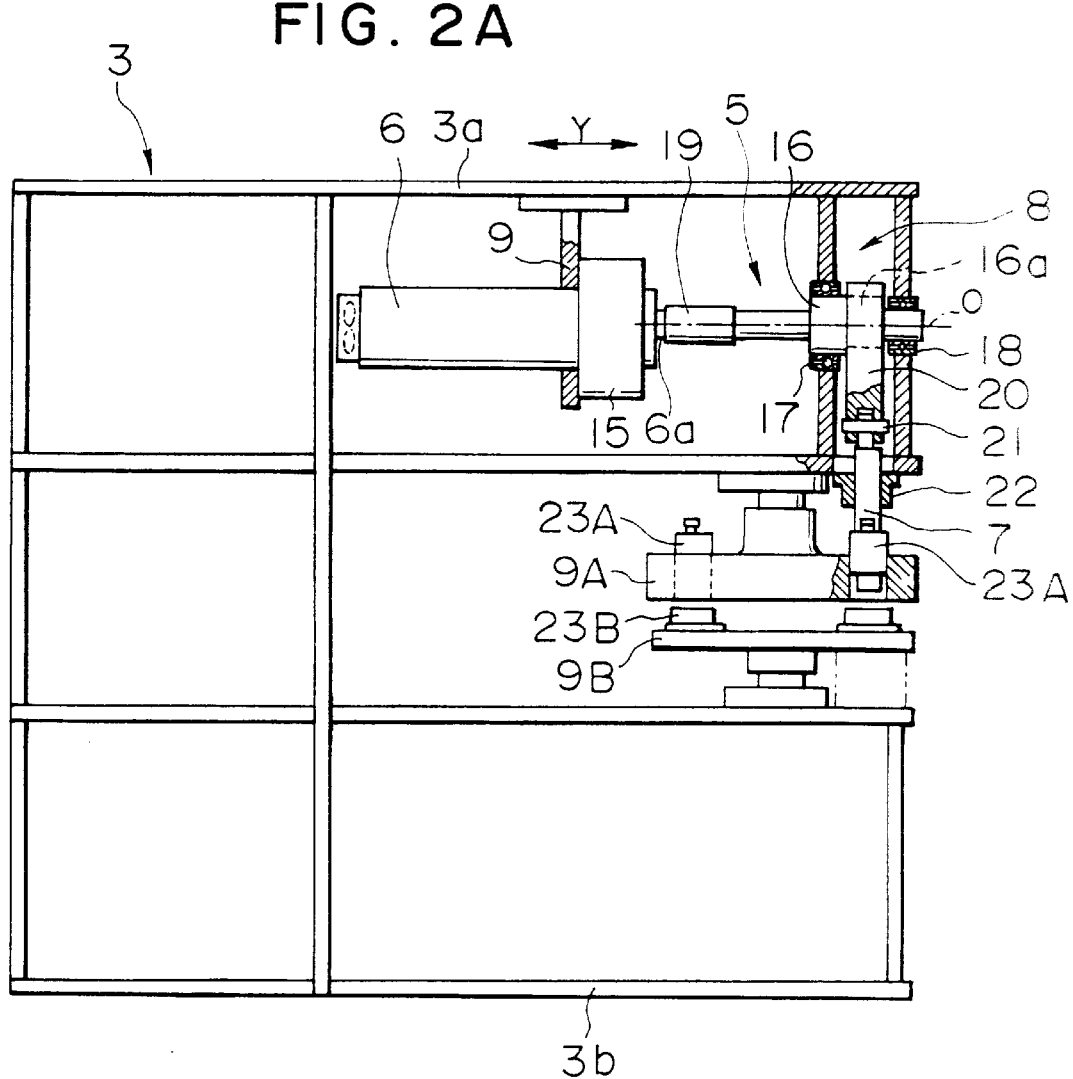
Figure 2B:
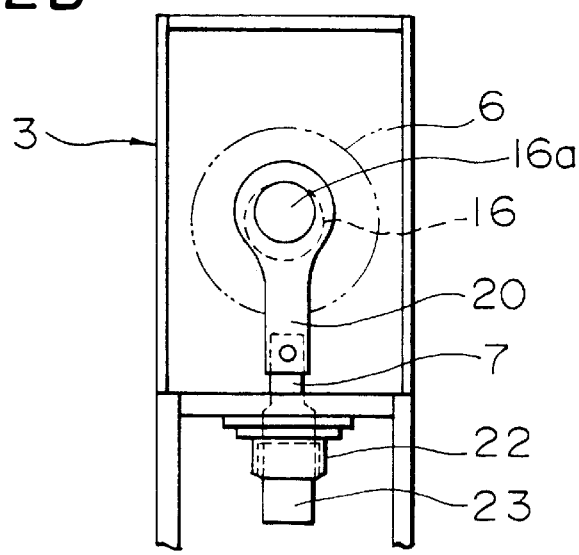

FIG. 2 shows the punch drive system 5. The servo-motor 6 incorporates a speed reduction device 15 in the tip, has an outer appearance extending along the axial direction of the motor and is stored in the upper frame 3a along the longitudinal direction (front-rear direction Y) of the upper frame 3a. The crank system 8 is of the eccentric cam type and the eccentric cam 16 is supported so as to freely rotate on a center of rotation 0 identical to the motor shaft 6a of the servo-motor 6 by a pair of bearings at the tip of the upper frame 3a.

The eccentric cam 16 and motor shaft 6a of the servo-motor 6 are connected via a coupling 19. An eccentric shaft part 16a of the eccentric cam 16 is fitted into a hole at the upper end of the crank arm 20 so as to be able to freely rotate via a bearing (not shown in the drawings). The ram 7 is connected to the lower end of the crank arm 20 via a pin 21 and the ram 7 is supported so as to be able to freely move vertically in a ram guide 22 arranged on the lower surface of the upper frame 3a. A T-groove shaped head connector part connected to the head of the punch tool 23 held in the upper turret 9A is present on the tip of the ram. It should be noted that the punch drive system 5 does not have an inertia application means such as a flywheel or the like.

Figure 3:
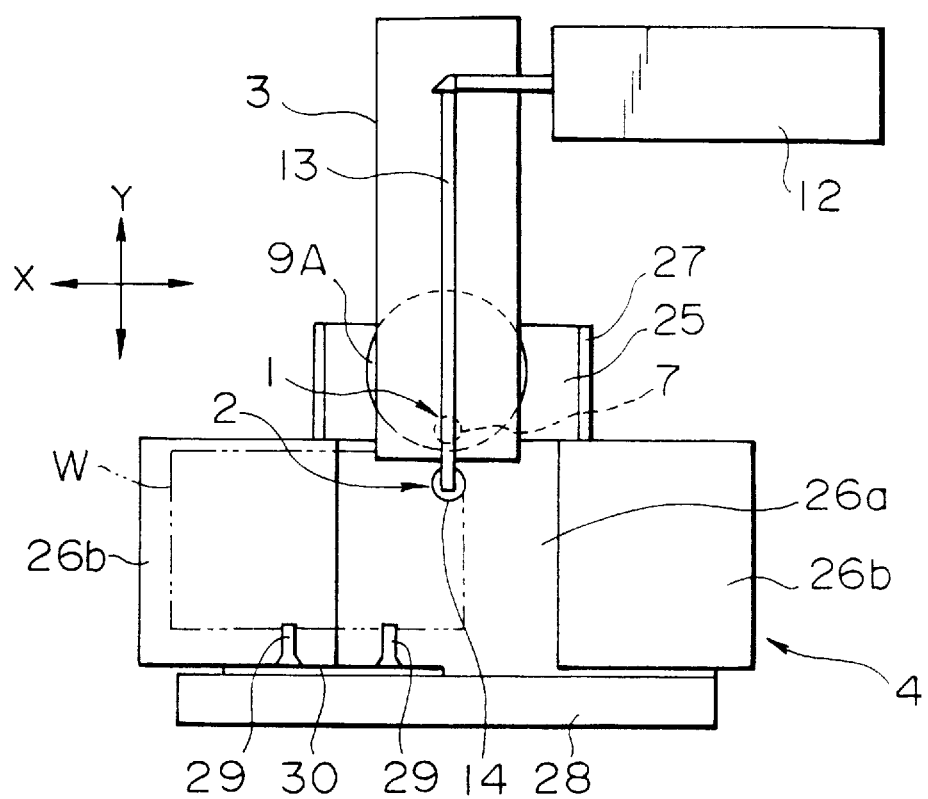
FIG. 3 is a plan view of the entire composite processing device of the present invention.

As shown in FIG. 3, the table device 4 is provided with a central fixed table 26a arranged on a bed 25 and a movable table 26b to the side and the movable table 26b is driven forward and backwards (Y direction) along rails 27 on the bed 25 together with the carriage 28. A cross slide 30 having a work holder 29 is arranged so as to be able to freely move to the left and right (X direction) on the carriage 28 and the work W held in the work holder 29 is delivered in the X and Y directions on the table 26a, 26b by the movement of the carriage 28 and cross slide 30.

Next, the method of operation of this composite processing device will be described.

Figure 1B:
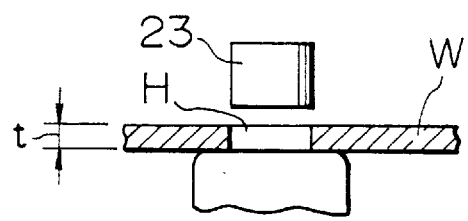
FIG. 1B is an explanatory diagram of that punch processing.

When punch processing by the maximum processing output (in this example 10 tons) being the press ability of the punch press device 1 is possible with respect to the thickness t, material and diameter (circumference) of the hole to be processed in the work W, processing is performed by the punch press part 1 (FIG. 1B). This kind of processing by the punch press part 1 enables higher speed processing than processing by the laser processing part 2 and moreover the operating costs are cheaper.

Figure 1D:
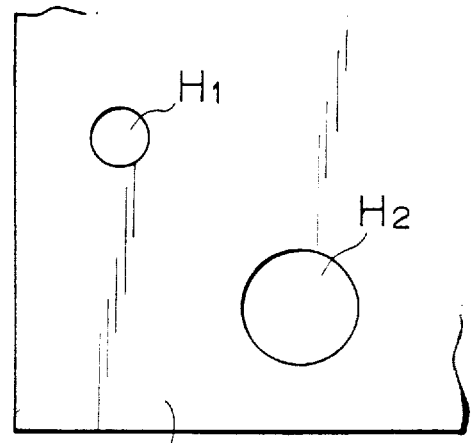
FIG. 1C is an explanatory diagram of that laser processing and Figure 1D is an explanatory diagram of a hole diameter in the work.
Figure 1C:
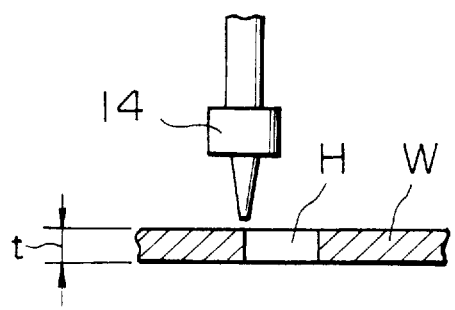

When punch processing is not possible by the maximum processing output of the punch press part 1, processing is performed by the laser processing part 2. In short, when the work thickness t is greater than a predetermined thickness as shown in FIG. 1C or when processing of holes with a large circumference as shown by the hole $H_2$ of FIG. 1D is to be performed, laser processing is performed.

Furthermore, processing using the laser processing part 2 is performed for the cut processing of complicated shapes which can not be performed by the tools arranged on the turret 9A, 9B even if the processing is below the maximum processing output of the punch press part 1.

In short, the output necessary for work processing does not exceed the maximum processing output of the punch press part 1 and moreover, processing is always performed by the punch press part 1 when processing by the tools 23A, 23B provided on the turret 9A, 9B of the punch press part 1 is possible. In all other cases, work processing is performed by the laser processing part 2. The proper use of the punch press part 1 and the laser processing part 2 is set in the processing program 31 of the NC device (FIG. 4) being the control device that controls this composite processing device.

As this composite processing device has this kind of laser processing part 2, the work processing may be performed problem free even if the maximum processing output of the punch press part 1 is kept low. The press processing performs speed control by the servo-motor 6 and as low noise and low vibration is possible, the laser processing may be maintained at high accuracy without effecting the optical devices or the like of the laser processing part for which vibration is detrimental.

In general, the majority of punch processing is possible using a small press ability and the laser processing part 2 may be used only for processing requiring a large press ability or processing of complicated shapes. Due to this, even after consideration of the various advantages and disadvantages such as increased operating costs and decreased processing efficiency due to the use of the laser processing part 2 or when a composite processing device is produced using a punch press part with a large press ability, the equipment costs can be reduced by using the punch press part 1 of low press ability as in the present invention.

Furthermore, as the press drive part 5 of the punch press part 1 used on the present embodiment drives the ram 7 directly by only the servo-motor 6 and crank system 8, the controlability is high, low noise can be achieved by decreasing the punch speed mid-stroke immediately before the contact with the work W and moreover, control that restricts the decrease in hit rate to a minimum can be easily performed. Due to this, highly efficient punch processing of a plurality of holes of those which are to be processed is possible and the decrease in efficiency is supplemented by laser processing some of the holes.

It is preferable to pre-set the standards of hole diameter (circumferential length), work material and thickness for the decision of whether to process by the punch press part 1 or the laser processing part 2 by the production steps of the processing program 31 for numerically controlling the composite processing device.

Figure 4:
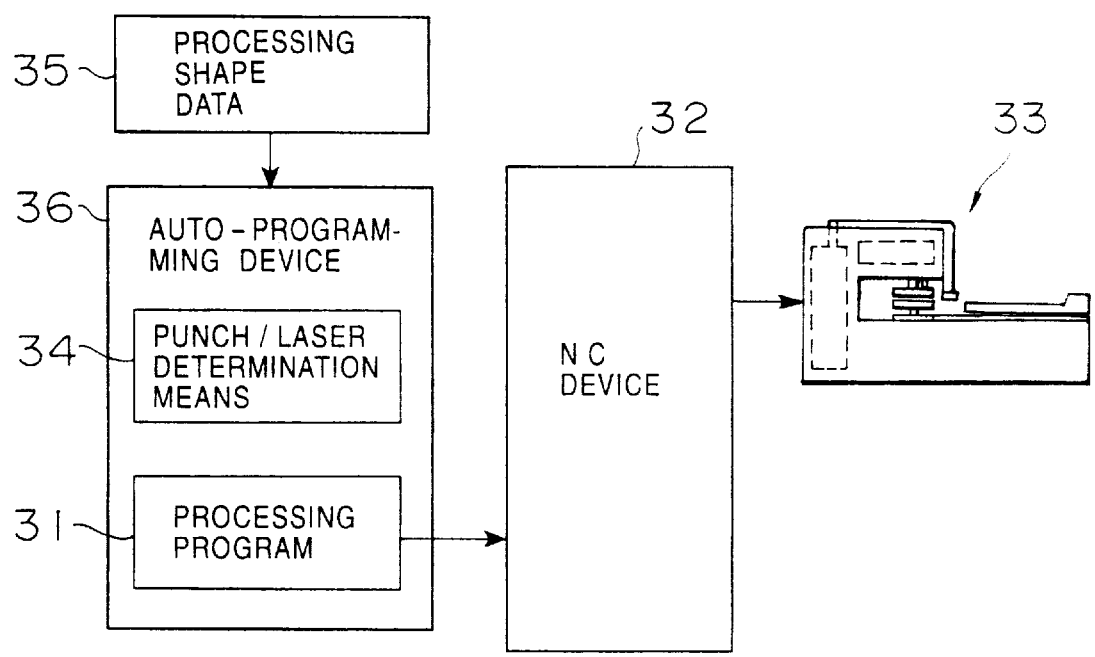
FIG. 4 is an explanatory diagram showing the composite processing device and that control.

For example, as shown in FIG. 4, when controlling this composite processing device 33 by executing by the NC device 32 a processing program 31 automatically produced by the auto-programming device 36, a punch/laser determination means 34 is set in the auto-programming device 36. The auto-programming device 36 is a means that automatically produces the processing program 31 by the input of work processing data such as processing shape data 35, processing conditions and material or the like. The punch/laser determination means 34 is arranged with determination standards which assign either the punch press part 1 or the laser processing part 2 by predetermined values obtained by the mutual relationship of the work thickness, material and circumferential length with respect to the hole processing. These determination standards determine each of the set values for the work thickness, material and circumferential length and it is preferable to pre-arrange them as a table.

As the composite processing device of the present invention is provided with a punch press part driven by a servo-motor and a laser processing part having a maximum processing output higher than the punch press part and there is a laser processing part, the work processing may be performed problem free even if the maximum processing output of the punch press part is kept low. As the press processing performs speed control by a servo-motor and as low noise and low vibration are possible, the laser processing may be maintained at high accuracy without effecting the optical devices or the like of the laser processing part for which vibration is detrimental.

On the above arrangement, when the punch drive system of the punch press part comprises a servo-motor and a crank system that converts the rotation of the servo-motor to a reciprocal movement of the ram, the punch drive system may comprise a simple structure without using a special system-such as a power increase system or the like, the number of parts may be reduced, the entire device reduced in size and simplified.

On the aforementioned arrangement of the aforementioned composite processing device, as the output required during work processing does not exceed the maximum processing output of the punch press device and moreover, as when processing is possible by a tool provided on the punch press part, processing is performed by the punch press part but in all other cases, work processing is performed by the laser processing part and work which may be processed by either the laser processing part or punch press part is without fail performed by the punch press part, work processing may be performed with reduced energy costs. Furthermore, the processing time may be restricted to the minimum time necessary.

We claim:

1. A composite processing device, comprising:
   a punch press part driven by a servo-motor;
   a laser processing part; and
   a punch/laser determination means which assigns either the punch press part or the laser processing part in accordance with a predetermined work processing data.

2. The composite processing device as recited in claim 1, wherein the punch press part further comprises a crank system that converts a rotation of the servo-motor into a reciprocating movement.

3. The composite processing device as recited in claim 1, wherein the punch press part performs a work processing when an output required during the work processing does not exceed a maximum processing output of the punch press device, and wherein the punch/laser determination means assigns the punch press part when the work processing can be performed by a tool provided on the punch press part, and assigns the laser processing part when the work processing can not be performed by the tool provided on the punch press part.

4. The composite processing device as recited in claim 2, wherein the punch press part performs a work processing when an output required during the work processing does not exceed a maximum processing output of the punch press device, and wherein the punch/laser determination means assigns the punch press part when the work processing can be performed by a tool provided on the punch press part, and assigns the laser processing part when the work processing can not be performed by the tool provided on the punch press part.

* * * * *